United States Patent
Jimenez et al.

(10) Patent No.: US 11,456,448 B2
(45) Date of Patent: Sep. 27, 2022

(54) PROCESS FOR MAKING AN AT LEAST PARTIALLY COATED ELECTRODE ACTIVE MATERIAL

(71) Applicant: BASF SE, Ludwigshafen am Rhein (DE)

(72) Inventors: Jose Jimenez, Union, NJ (US); Robert Prunchak, Union, NJ (US)

(73) Assignee: BASF SE

(*) Notice: Subject to any disclaimer, the term of this patent is extended or adjusted under 35 U.S.C. 154(b) by 115 days.

(21) Appl. No.: 16/975,952

(22) PCT Filed: Mar. 12, 2019

(86) PCT No.: PCT/EP2019/056084
§ 371 (c)(1),
(2) Date: Aug. 26, 2020

(87) PCT Pub. No.: WO2019/179815
PCT Pub. Date: Sep. 26, 2019

(65) Prior Publication Data
US 2020/0411837 A1 Dec. 31, 2020

(30) Foreign Application Priority Data
Mar. 21, 2018 (EP) .................. 18163012

(51) Int. Cl.
| | |
|---|---|
| H01M 4/04 | (2006.01) |
| H01M 4/131 | (2010.01) |
| H01M 4/1391 | (2010.01) |
| H01M 4/505 | (2010.01) |
| H01M 4/525 | (2010.01) |
| H01M 4/62 | (2006.01) |
| H01M 10/0525 | (2010.01) |
| H01M 4/02 | (2006.01) |

(52) U.S. Cl.
CPC ......... *H01M 4/049* (2013.01); *H01M 4/0416* (2013.01); *H01M 4/131* (2013.01); *H01M 4/1391* (2013.01); *H01M 4/505* (2013.01); *H01M 4/525* (2013.01); *H01M 4/628* (2013.01); *H01M 10/0525* (2013.01); *H01M 2004/028* (2013.01)

(58) Field of Classification Search
CPC .... H01M 4/049; H01M 4/0416; H01M 4/131; H01M 4/1391
See application file for complete search history.

(56) References Cited

U.S. PATENT DOCUMENTS

| | | |
|---|---|---|
| 8,993,051 B2 | 3/2015 | Kelder et al. |
| 9,130,212 B1 | 9/2015 | Kokado et al. |
| 9,196,901 B2 | 11/2015 | Se-Hee et al. |
| 9,406,928 B2 | 8/2016 | Kokado et al. |
| 2018/0294477 A1 | 10/2018 | Shin et al. |

FOREIGN PATENT DOCUMENTS

| | | |
|---|---|---|
| EP | 2 624 342 A1 | 8/2013 |
| EP | 3 121 874 A1 | 1/2017 |
| EP | 3 282 506 A1 | 2/2018 |
| JP | 2005-251716 A | 9/2005 |
| JP | 5359140 B2 | 12/2013 |
| KR | 10-2018-0010122 A | 1/2018 |
| WO | WO 2017/042047 A1 | 3/2017 |
| WO | WO 2019/154701 A1 | 8/2019 |
| WO | WO 2019/154702 A1 | 8/2019 |

OTHER PUBLICATIONS

International Search Report dated Apr. 25, 2019 in PCT/EP2019/056084 filed on Mar. 12, 2019.
Extended European Search Report dated Jun. 25, 2018 in European Patent Application No. 18163012.0, 4 pages.

*Primary Examiner* — Austin Murata
(74) *Attorney, Agent, or Firm* — Finnegan, Henderson, Farabow, Garrett & Dunner LLP

(57) ABSTRACT

A process for making an at least partially coated electrode active material may involve, with an electrode active material of formula $Li_{1-x}TM_{1-x}O_2$, wherein TM is a combination of Ni, Co and, optionally, Mn, and, optionally, at least one metal selected from Al, Ti and Zr, and x is in the range of from 0 to 0.2, treating the electrode active material with at least one compound of W or Mo that bears at least one group or ion that is replaced or displaced when such compound reacts with the surface of the electrode active material particle, treating the surface-reacted material with an agent to decompose the compound of W or Mo, repeating the sequence 1 to 100 times, wherein the average thickness of the resulting coating is in the range of from 0.1 to 50 nm.

18 Claims, No Drawings

PROCESS FOR MAKING AN AT LEAST PARTIALLY COATED ELECTRODE ACTIVE MATERIAL

The present invention is directed towards a process for making an at least partially coated electrode active material wherein said process comprises the following steps:

(a) Providing an electrode active material according to general formula $Li_{1+x}TM_{1-x}O_2$, wherein TM is a combination of Ni, Co and, optionally, Mn, and, optionally, at least one metal selected from Al, Ti and Zr, and x is in the range of from zero to 0.2, (b) treating said electrode active material with at least one compound of W or Mo that bears at least one group or ion that is replaced or displaced when such compound reacts with the surface of said electrode active material particle, (c) treating the material obtained in step (b) with an agent to decompose the compound of W or Mo, (d) repeating the sequence of steps (b) and (c) from one to 100 times, wherein the average thickness of the resulting coating is in the range of from 0.1 to 50 nm.

Lithium ion secondary batteries are modern devices for storing energy. Many application fields have been and are contemplated, from small devices such as mobile phones and laptop computers through car batteries and other batteries for e-mobility. Various components of the batteries have a decisive role with respect to the performance of the battery such as the electrolyte, the electrode materials, and the separator. Particular attention has been paid to the cathode materials. Several materials have been suggested, such as lithium iron phosphates, lithium cobalt oxides, and lithium nickel cobalt manganese oxides. Although extensive research has been performed the solutions found so far still leave room for improvement.

One problem of lithium ion batteries is attributed to undesired reactions on the surface of the cathode active materials. Such reactions may be a decomposition of the electrolyte or the solvent or both. It has thus been tried to protect the surface without hindering the lithium exchange during charging and discharging. Examples are attempts to coat the cathode active materials with, e.g., aluminium oxide or calcium oxide, see, e.g., U.S. Pat. Nos. 8,993,051 and 9,196,901. However, the coating interferes with electrochemical performance wherein power density is compromised and thus battery output is diminished.

Lithium tungstate coatings have been suggested as well, see, U.S. Pat. No. 9,406,928 and JP 5,359,140. However, it has been observed that the battery electrochemical performance drops.

It was therefore an objective of the present invention to provide a process by which electrode active materials may be coated to reduce their tendency of resistance build-up during repeated cycling without losing general electrochemical performance.

Accordingly, the process as defined at the outset has been found, hereinafter also referred to as inventive process or as process according to the (present) invention. The inventive process is a process for making an at least partially coated electrode active material.

The term "at least partially coated" as used in the context with the present invention refers to at least 80% of the particles of a batch of particulate material being coated, and to at least 75% of the surface of each particle being coated, for example 75 to 99.99% and preferably 80 to 90%. The term "at least partially coated" includes completely coated.

The average thickness of such coating may be very low, for example 0.1 to 50 nm. In some embodiments, the average thickness may be in the range of from 0.2 to 15 nm, even more preferred 0.3 to 10 nm. In further embodiments, the thickness of such coating is in the range of from 16 to 50 nm. The thickness in this context refers to an average thickness determined mathematically by calculating the amount of compound of W or Mo per $m^2$ of particle surface and assuming a 100% conversion.

The inventive process comprises three steps (a), (b) and (c), in the context of the present invention also referred to as step (a), step (b) and step (c).

Step (a) includes providing an electrode active material according to general formula $Li_{1+x}TM_{1-x}O_2$, wherein TM is a combination of Ni, Co and, optionally, Mn, and, optionally, at least one metal selected from Al, Ti and Zr, and x is in the range of from zero to 0.2.

TM may be selected from combinations of Ni and Co, or from combinations of Ni, Mn and Co, optionally in each case with at least one more metal selected from Al, Ti, Zr, W, and Mo, preferably at least one of Al, W, Ti and Zr. Preferred are combinations of Ni and Co and of Ni and Co and Mn, optionally in each case with at least one more metal selected from Al, W, Ti and Zr.

In a preferred embodiment, TM is a combination of metals according to general formula (I)

$$(Ni_aCo_bMn_c)_{1-d}M_d \qquad (I)$$

with a being in the range of from 0.5 to 0.95, preferably 0.6 to 0.95 b being in the range of from 0.025 to 0.2, c being in the range of from 0.025 to 0.3, preferably 0.1 to 0.2, and d being in the range of from zero to 0.1, M is Al, Ti or Zr, preferably Al, and $a+b+c=1$.

Particularly preferred are $Li_{(1+x)}[Ni_{0.6}Co_{0.2}Mn_{0.2}]_{(1-x)}O_2$, $Li_{(1+x)}[Ni_{0.7}Co_{0.2}Mn_{0.1}]_{(1-x)}O_2$, $Li_{(1+x)}[Ni_{0.85}Co_{0.1}Mn_{0.05}]$, $Li_{(1+x)}[Ni_{0.8}Co_{0.1}Mn_{0.1}]_{(1-x)}O_2$, and $Li_{(1+x)}[(Ni_{0.6}Co_{0.2}Mn_{0.2})_{1-d}Al_d]_{(1-x)}O_2$ each with x and d—if applicable—as defined above.

Said electrode active material is preferably provided without any additive such as conductive carbon or binder but as free-flowing powder.

Many elements are ubiquitous. For example, sodium, copper and chloride are detectable in certain very small proportions in virtually all inorganic materials. In the context of the present invention, proportions of less than 0.01% by weight of cations or anions are disregarded. A compound of formula (I) which comprises less than 0.01% by weight of sodium is thus considered to be sodium-free in the context of the present invention.

In one embodiment of the present invention the electrode active material provided in step (a) has an average particle diameter (D50) in the range of from 3 to 20 μm, preferably from 5 to 16 μm. The average particle diameter can be determined, e. g., by light scattering or LASER diffraction or electroacoustic spectroscopy. The particles are usually composed of agglomerates from primary particles, and the above particle diameter refers to the secondary particle diameter.

In one embodiment of the present invention, the electrode active material provided in step (a) has a specific surface area (BET), hereinafter also referred to as "BET surface", in the range of from 0.1 to 1.5 $m^2$/g. The BET surface may be determined by nitrogen adsorption after outgassing of the sample at 200° C. for 30 minutes or more and beyond this in accordance with DIN ISO 9277:2010.

Said cathode active material provided in step (a) may have a residual moisture content. For example, it may have a residual moisture content in the range of from 50 to 1,000 ppm, preferably from 100 to 400 ppm. The residual moisture content may be determined by Karl-Fischer titration.

In step (b), said electrode active material is treated with at least one compound of W or Mo that bears at least one group or ion that is replaced or displaced when such compound reacts with the surface of said electrode active material particle. Such compounds are hereinafter briefly referred to as W compound or Mo compound, respectively.

The term "reacts with the surface" will refer to a chemical reaction with a reactive group on the surface, for example a hydroxyl group or a reactive oxide group, or with moisture bound by physisorption or chemisorption, or with an impurity such as $LiOH$ or $Li_2CO_3$ on the surface of said electrode active material particle.

In one embodiment of the present invention the compound for treatment according to step (b) is selected from carbonyls, $C_1$-$C_5$-alkyls, amides, alkoxides, and halides of W or Mo, and combinations of at least two of the foregoing.

Examples of compounds of Mo are
  halides, for example fluorides, chlorides, bromides and iodides, including oxy-halides of Mo, for example $MoF_6$, $MoCl_5$, $MoOCl_4$, $MoCl_3$,
  Mo $C_1$-$C_5$-alkyl compounds, $C_1$-$C_5$-alkyl being same or different, for example dimethyl molybdenum, or bound in combination with halides as for example in bis (cyclopentadienyl)molybdenum(IV) dichloride and cyclopentadienylmolybdenum(V) tetrachloride
  Mo alkoxides or oxo-complexes, preferably $C_1$-$C_5$-alkoxides, $C_1$-$C_5$-alkyl being same or different, for example molybdenum(V) ethoxide and $Mo(thd)_3$ where thd=2,2,6,6-tetramethylheptane-3,5-dionato,
  amides of Mo, especially alkylamides of Mo, for example bis(tert-butylimido)bis(dimethylamido)-molybdenum,
  Mo carbonyl compounds in particular $Mo(CO)_6$, and also bound in combination with alkoxides or $C_1$-$C_5$-alkyl compounds as for example in the cyclopentadienylmolybdenum(II) tricarbonyl dimer,
and in particular $Mo(CO)_6$.

Examples of compounds of W are
  halides, for example fluorides, chlorides, bromides and iodides, including oxy-halides of W, for example $WF_6$, $WCl_4$, $WOCl_4$,
  W $C_1$-$C_5$-alkyl compounds, $C_1$-$C_5$-alkyl being same or different, for example hexamethyltungsten, or bound in combination with halides as for example in bis(cyclopentadienyl)tungsten(IV) dichloride or as hydride as in bis(cyclopentadienyl)tungsten(IV) dihydride
  W alkoxides or oxo-complexes, preferably $C_1$-$C_5$-alkoxides, $C_1$-$C_5$-alkyl being same or different, for example β-diketonate dioxotungsten(VI) complexes and oxo-alkoxide tungsten(VI) complexes with general formula $WO(OR)_4$ where R stands for the $C_1$-$C_5$ alkyl which may also be partially halogenated
  amides of W, especially alkylamides of W, for example bis(tertbutylimino)bis(dimethylamino)tungsten(VI), $WN(N(CH_3)_2)_3$ and $W_2(N(CH_3)_2)_6$,
  W carbonyl compounds in particular $W(CO)_6$, and also bound in combination with $C_1$-$C_5$-alkyl compounds or alkoxides as for example in bis(acetylacetonato)tricarbonyl tungsten(II),
and in particular $W(CO)_6$.

In one embodiment of the present invention, the amount of the respective Mo compound or W compound is in the range of 0.1 to 1 g/kg electrode active material.

Preferably, the amount of W compound or Mo compound, respectively, is calculated to amount to 20 to 200% of a monomolecular layer on said electrode active material per cycle.

In one embodiment of the inventive process, step (b) is performed at a temperature in the range of from 15 to 600° C., preferably 15 to 500° C., more preferably 20 to 400° C., and even more preferably 50 to 300° C. It is preferred to select a temperature in step (b) at which compound of W or Mo, as the case may be, is in the gas phase and not prone to decomposition prior to interaction with the electrode active material.

In one embodiment of the present invention, step (b) is carried out at normal pressure but step (b) may as well be carried out at reduced or elevated pressure. For example, step (b) may be carried out at a pressure in the range of from 1 mbar to 1 bar above normal pressure, preferably 10 to 150 mbar above normal pressure. In the context of the present invention, normal pressure is 1 atm or 1013 mbar. In other embodiments, step (b) may be carried out at a pressure in the range of from 150 mbar to 560 mbar above normal pressure. In other embodiments, step (b) is carried out at a pressure of 999 to 1 mbar below normal pressure.

In a preferred embodiment of the present invention, the duration of step (b) is in the range of from 1 second to 2 hours, preferably from 15 seconds up to 30 minutes.

In one embodiment of the present invention, Mo compound or W compound is introduced into the reactor with a flow of a carrier gas, preferably with e flow of nitrogen or argon.

In a third step, in the context of the present invention also referred to as step (c), the material obtained in step (b) is treated with an agent to decompose the compound of W or Mo, said agent also referred to as "decomposing agent".

Suitable decomposing agents depend on the nature of the respective W or Mo compound and on its oxidation state.

In one embodiment of the present invention, decomposing agent in step (c) is selected from oxygen, peroxides and ozone. Such decomposing agents are preferably selected in embodiments wherein W or Mo, as the case may be, in the respective W or Mo compound are in an oxidation state of less than +VI. Examples of peroxides are hydrogen peroxide and organic peroxides such as tert-butyl peroxide.

In one embodiment of the present invention, decomposing agent in step (c) is selected from hydrogen, water and $C_1$-$C_4$-alkyl alcohols such as methanol or ethanol or isopropanol. Such decomposing agents are preferably selected in embodiments wherein W or Mo, as the case may be, in the respective W or Mo compound are in an oxidation state of +VI.

Without wishing to be bound by any theory, it is believed that in case CO ligands are removed with oxygen, peroxides or ozone, at least a certain percentage of said CO is oxidized to $CO_2$.

In one embodiment of the present invention, step (c) is carried out at a temperature in the range of from 50 to 300° C.

In a preferred embodiment of the present invention, the duration of step (c) is in the range of from 1 second to 2 hours, preferably 15 seconds up to 30 minutes.

In one embodiment of the present invention, step (c) is carried out at normal pressure but step (c) may as well be carried out at reduced or elevated pressure. For example, step (c) may be carried out at a pressure in the range of from 1 mbar to 1 bar above normal pressure, preferably 10 to 250 mbar above normal pressure. In the context of the present invention, normal pressure is 1 atm or 1013 mbar. In other embodiments, step (c) may be carried out at a pressure in the range of from 150 mbar to 560 mbar above normal pressure. In other embodiments, step (c) is carried out at a pressure of 999 to 1 mbar below normal pressure.

Steps (b) and (c) may be carried out at the same pressure or at different pressures, preferred is at the same pressure.

In one embodiment of the present invention, the reactor in which the inventive process is carried out is flushed or purged with an inert gas between steps (b) and (c), for example with dry nitrogen or with dry argon. Suitable flushing—or purging—times are 1 second to 60 minutes. It is preferred that the amount of inert gas is sufficient to exchange the contents of the reactor of from one to 15 times. By such flushing or purging, the production of by-products such as separate particles of reaction product of metal halide or metal carbonyl or metal alkoxide or metal amide or alkyl metal compound, respectively, with water can be avoided. In the case of the couple trimethyl aluminum and water, such by-products are methane and alumina or excess of the reactant trimethyl aluminum that is not deposited on the particulate material. Said flushing also takes place after step (c), thus before another step (b).

In one embodiment of the present invention, each purging step between (b) and (c) has a duration in the range of from one second to ten minutes.

In one embodiment of the present invention, the reactor is evacuated between steps (b) and (c). Said evacuating may also take place after step (c), thus before another step (b). Evacuation in this context includes any pressure reduction, for example 1 to 500 mbar (abs), preferably 1 to 100 mbar (abs).

Steps (b) and (c) may be carried out in sequence or simultaneously. Preferably, they are carried out in sequence.

In one embodiment of the present invention steps (b), (c) and (d) are performed in the gas phase. This means that compound of W or Mo, as the case may be, is in the gas phase as well as agent to decompose the compound of W or Mo in step (c). In any repetition in accordance with (d) similar principles apply. Said electrode active materials remains solid during the inventive process.

In one embodiment of the present invention, steps (b) to (d) are performed in a rotary kiln, a free fall mixer, a continuous vibrating bed or in a fluidized bed.

Each of steps (b) and (c) may be carried out in a fixed bed reactor, in a fluidized bed reactor, in a forced flow reactor or in a mixer, for example in a compulsory mixer or in a free-fall mixer. Examples of fluidized bed reactors are spouted bed reactors. Examples of compulsory mixers are ploughshare mixers, paddle mixers and shovel mixers. Preferred are ploughshare mixers. Preferred ploughshare mixers are installed horizontally, the term horizontal referring to the axis around which the mixing element rotates. Preferably, the inventive process is carried out in a shovel mixing tool, in a paddle mixing tool, in a Becker blade mixing tool and, most preferably, in a ploughshare mixer in accordance with the hurling and whirling principle. Free fall mixers are using the gravitational force to achieve mixing. In a preferred embodiment, steps (b) and (c) of the inventive process are carried out in a drum or pipe-shaped vessel that rotates around its horizontal axis. In a more preferred embodiment, steps (b) and (c) of the inventive process are carried out in a rotating vessel that has baffles.

In one embodiment of the present invention, the rotating vessel has in the range of from 2 to 100 baffles, preferably 2 to 20 baffles. Such baffles are preferably flush mount with respect to the vessel wall.

In one embodiment of the present invention, such baffles are axially symmetrically arranged along the rotating vessel, drum, or pipe. The angle with the wall of said rotating vessel is in the range of from 5 to 45°, preferably 10 to 20°. By such arrangement, they can transport coated cathode active material very efficiently through the rotating vessel.

In one embodiment of the present invention, said baffles reach in the range of from 10 to 30% into the rotating vessel, referring to the diameter.

In one embodiment of the present invention, said baffles cover in the range of from 10 to 100%, preferably 30 to 80% of the entire length of the rotating vessel. In this context, the term length is parallel to the axis of rotation.

In a preferred embodiment of the present invention the inventive process comprises the step of removing the coated material from the vessel or vessels, respectively, by pneumatic conveying, e.g. 20 to 100 m/s.

Step (d) includes repeating the sequence of steps (b) and (c) once to 100 times, preferably twice to 50 times.

Repetition according to (d) may include repeating a sequence of steps (b) and (c) each time under exactly the same conditions or under modified conditions but still within the range of the above definitions. For example, each step (b) may be performed under exactly the same conditions, or, e.g., each step (b) may be performed under different temperature conditions or with a different duration, for example 220° C., then 200° C. and 180° C. each from 1 second to 1 hour.

By performing the inventive process, at least partially coated electrode active materials are obtained that show improved electrochemical performance and stability during battery operation.

The inventive process may be modified by additional steps that are optional.

In an optional step (e), a post-treatment is performed by heating the material obtained after the last step (d) at a temperature from 150 to 600° C., preferred are 200 to 500° C., and even more preferably, from 250 to 400° C.

In a preferred embodiment of the present invention, step (e) is carried out in an atmosphere of inert gas, for example nitrogen or a noble gas such as argon. Preferably, such inert gas has a water content in the range of from 0.2 to 10 ppm, preferably 0.2 to 5 ppm, and a carbon dioxide content ion the range of from 0.1 to 10 ppm. The $CO_2$ content may be determined by, e.g., optical methods using infrared light.

In one embodiment of the present invention, step (e) has a duration in the range of from 10 seconds to 2 hours, preferred are 10 minutes to 2 hours.

In a preferred embodiment, step (e) is carried out at normal pressure.

Step (e) may be performed in a rotary kiln. In special embodiments, step (e) may be performed in the same vessel as step (c).

In one embodiment of the present invention the inventive process comprises an additional coating step (f) wherein at least one oxide of Al, Zn, Ti, Si, P, Zr, Hf, Ni, Li, or Co, and combinations of at least two of the foregoing is coated on a material obtained from the above inventive process. Said additional coating may be applied by adding a sequence of steps of exposing at least partially coated electrode active material to a compound of Al, Zn, Ti, Si, P, Zr, Hf, Ni, Li, or Co, for example an alkoxide, amide, halide or alkyl compound or carbonyl compound, followed by decomposition through moisture or ozone.

Suitable example of such compounds are halides, nitrates, alkyl compounds, $C_1$-$C_4$-alkoxides, and amides.

Preferred examples of halides and nitrates are $Al(NO_3)_3$, $AlONO_3$, $TiCl_4$, $TiOCl_2$, $TiO(NO_3)_2$, $ZrCl_4$, $ZrOCl_2$, $ZrO(NO_3)_2$, $HfCl_4$, $HfOCl_2$, $HfO(NO_3)_2$, $SiCl_4$, $(CH_3)_3SiCl$, $CH_3SiCl_3$, $SnCl_4$, $ZnCl_2$, $Zn(NO_3)_2$, $MgCl_2$, $Mg(NO_3)_2$, $NiCl_2$, $Ni(NO_3)_2$, $CoCl_2$, and $Co(NO_3)_2$.

Preferred examples of $C_1$-$C_4$-alkoxides are $Zn(OCH_3)_2$, $Zn(OC_2H_5)_2$, $Mg(OCH_3)_2$, $Mg(OC_2H_5)_2$, $Ti[OCH(CH_3)_2]_4$, $Ti(OC_4H_9)_4$, $Zr(OC_4H_9)_4$, $Zr(OC_2H_5)_4$, $Si(OC_2H_5)_4$, $Si(OCH_3)_4$, $Si(O$-n-$C_3H_7)_4$, $Si(O$-iso-$C_3H_7)_4$, $Si(O$-n-$C_4H_9)_4$, $Al(OCH_3)_3$, $Al(OC_2H_5)_3$, $Al(O$-n-$C_3H_7)_3$, $Al(O$-iso-$C_3H_7)_3$, $Al(O$-sec.-$C_4H_9)_3$, and $Al(OC_2H_5)(O$-sec.-$C_4H_9)_2$.

Examples of alkyl compounds are n-$C_4H_9$—Mg(n-octyl), methyl lithium, n-butyl lithium, tert-butyl lithium, $Zn(CH_3)_2$, $Zn(C_2H_5)_2$, and aluminum alkyl compounds.

Examples of aluminum alkyl compounds are trimethyl aluminum, triethyl aluminum, triisobutyl aluminum, and methyl alumoxane. Examples of methylalumoxane are partially hydrolyzed trimethylaluminum types including compounds of the general stoichiometry $Al(CH_3)_2OH$ and $Al(CH_3)(OH)_2$.

Amides are sometimes also referred to as imides. Examples of metal are $Zr[N(C_2H_5)_2]_4$, $Zr[N(CH_3)_2]_4$, $Zr[(CH_3)N(C_2H_5)]_4$, $Hf[N(CH_3)_2]_4$, $SiH[N(CH_3)_2]_3$, and $Ti[N(CH_3)_2]_4$.

Particularly preferred compounds are selected from metal $C_1$-$C_4$-alkoxides and metal alkyl compounds, and even more preferred is trimethyl aluminum.

Particularly preferred is a sequence of exposure to trimethyl aluminum followed by exposure to moisture.

Another—optional—step is a thermal pre-treatment (g) before the first performance of step (b). Such thermal pre-treatment may include a heating of particulate electrode active material provided in step (a) to 100 to 300° C., for example for 15 minutes up to 5 hours, preferably under inert gas.

By such optional steps, the electrochemical performance of electrode active materials may be further improved.

A further aspect of the present invention is directed towards a particulate electrode active material, hereinafter also referred to as inventive particulate electrode active material. Inventive particulate electrode active material corresponds to general formula $Li_{1+x}TM_{1-x}O_2$, wherein TM is a combination of Ni, Co and, optionally, Mn, and, optionally, at least one metal selected from Al, Ti and Zr, and x is in the range of from zero to 0.2, wherein the outer surface of said particles is at least partially coated with an oxide selected from tungsten oxide and molybdenum oxide, wherein the average thickness of the resulting coating is in the range of from 0.1 to 50 nm, and, optionally, with an oxide or oxyhydroxide coating of at least one of Al, Zn, Ti, Si, P, Zr, Hf, Mo, Ni, Li, or Co and combinations of at least two of the foregoing.

TM has been defined above.

An example of tungsten oxides is $WO_3$. Examples of molybdenum oxides are $MoO_2$ and $MoO_3$.

Preferably, TM in inventive particulate material is selected from $Ni_{0.6}Co_{0.2}Mn_{0.2}$, $Ni_{0.7}Co_{0.2}Mn_{0.1}$, $Ni_{0.8}Co_{0.1}Mn_{0.1}$, $Ni_{0.85}Co_{0.1}Mn_{0.05}$, and $(Ni_{0.6}Co_{0.2}Mn_{0.2})_{1-d}Al_d$.

In one embodiment of the present invention inventive electrode active material has an average particle diameter (D50) in the range of from 3 to 20 µm, preferably from 5 to 16 µm. The average particle diameter can be determined, e. g., by light scattering or LASER diffraction or electroacoustic spectroscopy. The particles are usually composed of agglomerates from primary particles, and the above particle diameter refers to the secondary particle diameter.

In one embodiment of the present invention, inventive electrode active material has a specific surface area ("BET surface") in the range of from 0.1 to 1.5 m²/g. The BET surface may be determined by nitrogen adsorption after outgassing of the sample at 200° C. for 30 minutes or more accordance with DIN ISO 9277:2010.

In one embodiment of the present invention, the coating has an average thickness in the range of from 0.2 to 2 nm, preferably 0.3 to 1.0 nm.

Inventive electrode active materials are very well suited for cathodes in lithium ion batteries. They exhibit a low resistance build-up in the cause of repeated cycling, for example 500 or more cycles.

A further aspect of the present invention refers to electrodes comprising at least one electrode material active according to the present invention. They are particularly useful for lithium ion batteries. Lithium ion batteries comprising at least one electrode according to the present invention exhibit a good discharge behavior. Electrodes comprising at least one electrode active material according to the present invention are hereinafter also referred to as inventive cathodes or cathodes according to the present invention.

Cathodes according to the present invention can comprise further components. They can comprise a current collector, such as, but not limited to, an aluminum foil. They can further comprise conductive carbon and a binder.

Suitable binders are preferably selected from organic (co)polymers. Suitable (co)polymers, i.e. homopolymers or copolymers, can be selected, for example, from (co)polymers obtainable by anionic, catalytic or free-radical (co) polymerization, especially from polyethylene, polyacrylonitrile, polybutadiene, polystyrene, and copolymers of at least two comonomers selected from ethylene, propylene, styrene, (meth)acrylonitrile and 1,3-butadiene. Polypropylene is also suitable. Polyisoprene and polyacrylates are additionally suitable. Particular preference is given to polyacrylonitrile.

In the context of the present invention, polyacrylonitrile is understood to mean not only polyacrylonitrile homopolymers but also copolymers of acrylonitrile with 1,3-butadiene or styrene. Preference is given to polyacrylonitrile homopolymers.

In the context of the present invention, polyethylene is not only understood to mean homopolyethylene, but also copolymers of ethylene which comprise at least 50 mol % of copolymerized ethylene and up to 50 mol % of at least one further comonomer, for example α-olefins such as propylene, butylene (1-butene), 1-hexene, 1-octene, 1-decene, 1-dodecene, 1-pentene, and also isobutene, vinylaromatics, for example styrene, and also (meth)acrylic acid, vinyl acetate, vinyl propionate, $C_1$-$C_{10}$-alkyl esters of (meth) acrylic acid, especially methyl acrylate, methyl methacrylate, ethyl acrylate, ethyl methacrylate, n-butyl acrylate, 2-ethylhexyl acrylate, n-butyl methacrylate, 2-ethylhexyl methacrylate, and also maleic acid, maleic anhydride and itaconic anhydride. Polyethylene may be HDPE or LDPE.

In the context of the present invention, polypropylene is not only understood to mean homopolypropylene, but also copolymers of propylene which comprise at least 50 mol % of copolymerized propylene and up to 50 mol % of at least one further comonomer, for example ethylene and α-olefins such as butylene, 1-hexene, 1-octene, 1-decene, 1-dodecene and 1-pentene. Polypropylene is preferably isotactic or essentially isotactic polypropylene.

In the context of the present invention, polystyrene is not only understood to mean homopolymers of styrene, but also copolymers with acrylonitrile, 1,3-butadiene, (meth)acrylic acid, $C_1$-$C_{10}$-alkyl esters of (meth)acrylic acid, divinylbenzene, especially 1,3-divinylbenzene, 1,2-diphenylethylene and α-methylstyrene.

Another preferred binder is polybutadiene.

Other suitable binders are selected from polyethylene oxide (PEO), cellulose, carboxymethylcellulose, polyimides and polyvinyl alcohol.

In one embodiment of the present invention, binder is selected from those (co)polymers which have an average molecular weight $M_w$ in the range from 50,000 to 1,000,000 g/mol, preferably to 500,000 g/mol.

Binder may be cross-linked or non-cross-linked (co)polymers.

In a particularly preferred embodiment of the present invention, binder is selected from halogenated (co)polymers, especially from fluorinated (co)polymers. Halogenated or fluorinated (co)polymers are understood to mean those (co)polymers which comprise at least one (co)polymerized (co)monomer which has at least one halogen atom or at least one fluorine atom per molecule, more preferably at least two halogen atoms or at least two fluorine atoms per molecule. Examples are polyvinyl chloride, polyvinylidene chloride, polytetrafluoroethylene, polyvinylidene fluoride (PVdF), tetrafluoroethylene-hexafluoropropylene copolymers, vinylidene fluoride-hexafluoropropylene copolymers (PVdF-HFP), vinylidene fluoride-tetrafluoroethylene copolymers, perfluoroalkyl vinyl ether copolymers, ethylene-tetrafluoroethylene copolymers, vinylidene fluoride-chlorotrifluoroethylene copolymers and ethylene-chlorofluoroethylene copolymers.

Suitable binders are especially polyvinyl alcohol and halogenated (co)polymers, for example polyvinyl chloride or polyvinylidene chloride, especially fluorinated (co)polymers such as polyvinyl fluoride and especially polyvinylidene fluoride and polytetrafluoroethylene.

Inventive cathodes may comprise 1 to 15% by weight of binder(s), referring to electrode active material. In other embodiments, inventive cathodes may comprise 0.1 up to less than 1% by weight of binder(s).

A further aspect of the present invention is a battery, containing at least one cathode comprising inventive electrode active material, carbon, and binder, at least one anode, and at least one electrolyte.

Embodiments of inventive cathodes have been described above in detail.

Said anode may contain at least one anode active material, such as carbon (graphite), $TiO_2$, lithium titanium oxide, silicon, lithium or tin. Said anode may additionally contain a current collector, for example a metal foil such as a copper foil.

Said electrolyte may comprise at least one non-aqueous solvent, at least one electrolyte salt and, optionally, additives.

Non-aqueous solvents for electrolytes can be liquid or solid at room temperature and is preferably selected from among polymers, cyclic or acyclic ethers, cyclic and acyclic acetals and cyclic or acyclic organic carbonates.

Examples of suitable polymers are, in particular, polyalkylene glycols, preferably poly-$C_1$-$C_4$-alkylene glycols and in particular polyethylene glycols. Polyethylene glycols can here comprise up to 20 mol % of one or more $C_1$-$C_4$-alkylene glycols. Polyalkylene glycols are preferably polyalkylene glycols having two methyl or ethyl end caps.

The molecular weight $M_w$ of suitable polyalkylene glycols and in particular suitable polyethylene glycols can be at least 400 g/mol.

The molecular weight $M_w$ of suitable polyalkylene glycols and in particular suitable polyethylene glycols can be up to 5 000 000 g/mol, preferably up to 2 000 000 g/mol.

Examples of suitable acyclic ethers are, for example, diisopropyl ether, di-n-butyl ether, 1,2-dimethoxyethane, 1,2-diethoxyethane, with preference being given to 1,2-dimethoxyethane.

Examples of suitable cyclic ethers are tetrahydrofuran and 1,4-dioxane.

Examples of suitable acyclic acetals are, for example, dimethoxymethane, diethoxymethane, 1,1-dimethoxyethane and 1,1-diethoxyethane.

Examples of suitable cyclic acetals are 1,3-dioxane and in particular 1,3-dioxolane.

Examples of suitable acyclic organic carbonates are dimethyl carbonate, ethyl methyl carbonate and diethyl carbonate.

Examples of suitable cyclic organic carbonates are compounds of the general formulae (II) and (III)

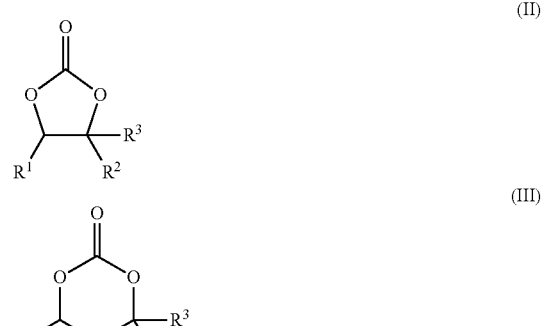

where $R^1$, $R^2$ and $R^3$ can be identical or different and are selected from among hydrogen and $C_1$-$C_4$-alkyl, for example methyl, ethyl, n-propyl, isopropyl, n-butyl, isobutyl, sec-butyl and tert-butyl, with $R^2$ and $R^3$ preferably not both being tert-butyl.

In particularly preferred embodiments, $R^1$ is methyl and $R^2$ and $R^3$ are each hydrogen, or $R^1$, $R^2$ and $R^3$ are each hydrogen.

Another preferred cyclic organic carbonate is vinylene carbonate, formula (IV).

The solvent or solvents is/are preferably used in the water-free state, i.e. with a water content in the range from 1 ppm to 0.1% by weight, which can be determined, for example, by Karl-Fischer titration.

Electrolyte (C) further comprises at least one electrolyte salt. Suitable electrolyte salts are, in particular, lithium salts.

Examples of suitable lithium salts are $LiPF_6$, $LiBF_4$, $LiClO_4$, $LiAsF_6$, $LiCF_3SO_3$, $LiC(C_nF_{2n+1}SO_2)_3$, lithium imides such as $LiN(C_nF_{2n+1}SO_2)_2$, where n is an integer in the range from 1 to 20, $LiN(SO_2F)_2$, $Li_2SiF_6$, $LiSbF_6$, $LiAlCl_4$ and salts of the general formula $(C_nF_{2n+1}SO_2)_tYLi$, where m is defined as follows:

t=1, when Y is selected from among oxygen and sulfur, t=2, when Y is selected from among nitrogen and phosphorus, and t=3, when Y is selected from among carbon and silicon.

Preferred electrolyte salts are selected from among $LiC(CF_3SO_2)_3$, $LiN(CF_3SO_2)_2$, $LiPF_6$, $LiBF_4$, $LiClO_4$, with particular preference being given to $LiPF_6$ and $LiN(CF_3SO_2)_2$.

In an embodiment of the present invention, batteries according to the invention comprise one or more separators by means of which the electrodes are mechanically separated. Suitable separators are polymer films, in particular porous polymer films, which are unreactive toward metallic lithium. Particularly suitable materials for separators are polyolefins, in particular film-forming porous polyethylene and film-forming porous polypropylene.

Separators composed of polyolefin, in particular polyethylene or polypropylene, can have a porosity in the range from 35 to 45%. Suitable pore diameters are, for example, in the range from 30 to 500 nm.

In another embodiment of the present invention, separators can be selected from among PET nonwovens filled with inorganic particles. Such separators can have porosities in the range from 40 to 55%. Suitable pore diameters are, for example, in the range from 80 to 750 nm.

Batteries according to the invention further comprise a housing which can have any shape, for example cuboidal or the shape of a cylindrical disk or a cylindrical can. In one variant, a metal foil configured as a pouch is used as housing.

Batteries according to the invention display a good discharge behavior, for example at low temperatures (zero ° C. or below, for example down to −10° C. or even less), a very good discharge and cycling behavior, in particular at high temperatures (45° C. or higher, for example up to 60° C.) in particular with respect to the capacity loss, and a good safety behavior at high temperatures such as 60° C. or more. Preferably, also the cycle stability and the C-rate capacity behavior are improved, or they are at least identical although the Li content is lower.

Batteries according to the invention can comprise two or more electrochemical cells that combined with one another, for example can be connected in series or connected in parallel. Connection in series is preferred. In batteries according to the present invention, at least one of the electrochemical cells contains at least one cathode according to the invention. Preferably, in electrochemical cells according to the present invention, the majority of the electrochemical cells contains a cathode according to the present invention. Even more preferably, in batteries according to the present invention all the electrochemical cells contain cathodes according to the present invention.

The present invention further provides for the use of batteries according to the invention in appliances, in particular in mobile appliances. Examples of mobile appliances are vehicles, for example automobiles, bicycles, aircraft or water vehicles such as boats or ships. Other examples of mobile appliances are those which move manually, for example computers, especially laptops, telephones or electric hand tools, for example in the building sector, especially drills, battery-powered screwdrivers or battery-powered staplers.

The invention is further illustrated by working examples.

WORKING EXAMPLES

General Remarks sccm: standard cubic centimeter per minute, standard: 20° C./1 atm ICP-OES: Inductively coupled plasma optical emission spectroscopy I. Cathode Active Materials I.1. Preparation of a Precursor for Cathode Active Materials A stirred tank reactor was filled with deionized water. The precipitation of mixed transition metal hydroxide precursor was started by simultaneous feed of an aqueous transition metal solution and an alkaline precipitation agent at a flow rate ratio of 1.9, and a total flow rate resulting in a residence time of 8 hours. The aqueous transition metal solution contained Ni, Co and Mn at a molar ratio of 6:2:2 as sulfates each and a total transition metal concentration of 1.65 mol/kg. The alkaline precipitation agent consisted of 25 wt. % sodium hydroxide solution and 25 wt. % ammonia solution in a weight ratio of 25. The pH value was kept at 12.0 by separate feed of an aqueous sodium hydroxide solution. After stabilization of particle size the resulting suspension was removed continuously from the stirred vessel. The mixed transition metal (TM) oxyhydroxide precursor was obtained by filtration of the resulting suspension, washing with distilled water, drying at 120° C. in air and sieving.

C-CAM.1 (a.1): The mixed transition metal oxyhydroxide precursor obtained according to 1.1 was mixed with $Al_2O_3$ (average particle diameter 6 nm) and LiOH monohydrate to obtain a concentration of 0.3 mole-% Al relative to Ni+Co+Mn+Al and a Li/(TM+Al) molar ratio of 1.03. The mixture was heated to 885° C. and kept for 8 hours in a forced flow of oxygen to obtain the electrode active material C-CAM 1.

D50=10 μm determined using the technique of laser diffraction in a Mastersize 3000 instrument from Malvern Instruments.

II. Coating with $W(CO)_6$ and ozone

II.1 Manufacture of Inventive Electrode Active Material CAM.2

A fluidized bed reactor with external heating jacket was charged with 100 g of C-CAM.1, and under an average pressure of 5 mbar C-CAM.1 was fluidized with Ar at a constant flow rate of 20 sccm. The fluidized bed reactor was heated to 200° C. and kept at 200° C. for 4 hours (step (a.1). To decrease filter congestion and aid in powder fluidization, the deposition encompassed regular reverse pulses of carrier gas alternating with pneumatic hammer impacts.

Step (b.1): After said 4 hours, the temperature was raised to 220° C. In a vessel, $W(CO)_6$ was heated to 65 to 70° C. $W(CO)_6$ in the gaseous state was introduced into the fluidized bed reactor through a sintered metal filter plate by opening a valve to a precursor reservoir that was charged with W(CO) in solid form and then kept at 65 to 70° C. in order to generate sufficient vapor pressure for the introduction into the fluidized bed reactor. The $W(CO)_6$ was diluted with argon as carrier gas. After a reaction period of five minutes non-reacted $W(CO)_6$ was removed through the Ar stream, and the reactor was purged with Ar for 5 minutes.

Step (c.1): Then, ozone as an 8% by volume mixture with $O_2$ was introduced into the fluidized bed reactor by opening a valve to an ozone generator that produced ozone from oxygen. After a reaction period of 5 minutes non-reacted ozone was removed through the argon stream, and the reactor was purged with argon for another 5 minutes.

Step (d.1): The above sequence of (b.1) and (c.1) was repeated twenty times.

The reactor was then cooled to 25° C. and the material so obtained was discharged. The resultant CAM.2 displayed the following properties: D50=10 μm determined using the technique of laser diffraction in a Mastersize 3000 instrument from Malvern Instruments. W-content: 330 ppm, determined by ICP-OES.

II.2: Manufacture of Inventive Electrode Active Material CAM.3

Experiment II.1 was repeated but steps (b.2) and (c.2) were performed at 200° C. The reactor was then cooled to 25° C. and the material so obtained was discharged. The resultant CAM.3 displayed the following properties: D50=10 μm determined using the technique of laser diffraction in a Mastersize 3000 instrument from Malvern Instruments. W-content: 300 ppm, determined by ICP-OES.

II.3: Manufacture of Inventive Electrode Active Material CAM.4

Experiment II.1 was repeated but steps (b.3) and (c.3) were performed at 240° C. The reactor was then cooled to 25° C. and the material so obtained was discharged. The resultant CAM.4 displayed the following properties: D50=10 μm determined using the technique of laser diffraction in a Mastersize 3000 instrument from Malvern Instruments. W-content: 250 ppm, determined by ICP-OES.

II.4: Manufacture of Inventive Electrode Active Material CAM.5

Experiment II.1 was repeated but the fluidized bed reactor was not discharged after the last sequence of W(CO)$_6$/ozone treatment. Instead, step (f.4) was performed.

The temperature of the fluidized bed reactor was lowered to 180° C. Trimethylaluminum (TMA) in the gaseous state was introduced into the fluidized bed reactor through a sintered filter plate by opening a valve to a precursor reservoir that contained TMA in liquid form and that was kept at 25° C. The TMA was diluted with Ar as carrier gas with 10 sccm. After a reaction period of 210 seconds non-reacted TMA was removed through the Ar stream, and the reactor was purged with Ar for 10 minutes, flow: 30 sccm. Then, water in the gaseous state was introduced into the fluidized bed reactor by opening a valve to a reservoir that contained liquid water kept at 25° C., with Ar as carrier gas with 10 sccm. After a reaction period of 120 seconds non-reacted water was removed through the Ar stream, and the reactor was purged with Ar at flow rate of 30 sccm for 10 min. The above sequence was repeated four times. The reactor was cooled to 25° C. and the material so obtained was discharged.

The determined Al uptake from ICP-OES was 260 ppm.

II.5: Manufacture of a Further Comparative Material, C-CAM.6

Experiment II.4 was repeated but with C-CAM.1 as starting material instead of CAM.4. Comparative material C-CAM.6 was obtained. C-CAM.6 does not contain any W. Al-content: 420 ppm, determined by ICP-OES.

The electrochemical performance of the inventive electrode active materials was excellent.

The invention claimed is:

1. A process for making an at least partially coated electrode active material, the process comprising:
   treating an initial electrode active material, of formula $Li_{1+x}TM_{1-x}O_2$, wherein TM is a combination of Ni, Co, optionally Mn, and optionally Al, Ti, and/or Zr, and x ranges from 0 to 0.2, with at least one compound of W or Mo comprising a group or ion that is replaced or displaced when the compound reacts with a surface of the initial electrode active material, to obtain a treated material;
   subjecting the treated material to an agent to decompose the compound of W or Mo, to obtain an intermediate material; and
   repeating the treating and the subjecting steps from 1 to 100 times substituting each subsequent intermediate material for the initial electrode active material, to obtain the at least partially coated electrode active material,
   wherein the at least partially coated electrode active material has an average coating thickness ranging from 0.1 nm to 50 nm.

2. The process of claim 1, wherein the treating and the subjecting are performed in gas phase.

3. The process of claim 1, wherein the compound for treating comprises a carbonyl of W, a carbonyl of Mo, a $C_1$-$C_5$-alkyl of W, a $C_1$-$C_5$-alkyl of Mo, an amide of W, an amide of Mo, an alkoxide of W, an alkoxide of Mo, a halide of W, and/or a halide of Mo.

4. The process of claim 1, wherein from the compound in the treating is $W(CO)_6$ or $Mo(CO)_6$.

5. The process of claim 1, wherein the agent comprises oxygen, a peroxide, and/or ozone.

6. The process of claim 1, wherein the agent comprises hydrogen, water, and/or a C1-C4-alkyl alcohol.

7. The process of claim 1, further comprising:
   thermally post-treating the obtained at least partially coated electrode active material.

8. The process of claim 1, wherein the treating, the subjecting, and the repeating steps are performed in a rotary kiln, a free fall mixer, a continuous vibrating bed, or a fluidized bed.

9. The process of claim 1, further comprising, between each of the treating and subjecting steps:
   purging an environment of the treated material.

10. The process of claim 1, wherein TM has a formula (I)

$$(Ni_aCo_bMn_c)_{1-d}M_d \qquad (I)$$

wherein
a is in a range of from 0.6 to 0.9,
b is in a range of from 0.05 to 0.2,
c is in a range of from 0 to 0.2,
d is in a range of from 0 to 0.1,
M is Ti, Zr, or Al, and $$a+b+c=1.$$

11. The process of claim 10, wherein TM is $Ni_{0.85}Co_{0.1}Al_{0.05}$, $N_{0.6}Co_{0.2}Mn_{0.2}$, $Ni_{0.7}Co_{0.2}Mn_{0.1}$ $Ni_{0.8}Co_{0.1}Mn_{0.1}$, $Ni_{0.85}Co_{0.1}Mn_{0.05}$, or 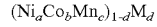 $(Ni_{0.6}Co_{0.2}Mn_{0.2})_{1-d}Al_d$.

12. The process of claim 1, further comprising:
   further coating the obtained at least partially coated electrode active material with an oxide comprising Al, Zn, Ti, Si, P, Zr, Hf, Ni, Li, and/or Co.

13. The process of claim 1, wherein TM is $Ni_{0.85}Co_{0.1}Al_{0.05}$.

14. The process of claim 1, wherein TM is $Ni_6Co_{0.2}Mn_{0.2}$.

15. The process of claim 1, wherein TM is $Ni_{0.7}Co_{0.2}Mn_{0.1}$.

16. The process of claim 1, wherein TM is $Ni_{0.8}Co_{0.1}Mn_{0.1}$.

17. The process of claim 1, wherein TM is $Ni_{0.85}Co_{0.1}Mn_{0.05}$.

18. The process of claim 10, wherein TM is $(Ni_{0.6}Co_{0.2}Mn_{0.2})_{1-d}Al_d$.

* * * * *